(12) United States Patent
Karbula et al.

(10) Patent No.: US 8,598,865 B2
(45) Date of Patent: Dec. 3, 2013

(54) MEASURING DEVICE WITH A MEASURING- AND OPERATING ELECTRONICS FOR MONITORING A MEASUREMENT SIGNAL

(75) Inventors: Jiri Karbula, Riehen (CH); Andreas Fuz, Efringen-Kirchen (DE)

(73) Assignee: Endress + Hauser Flowtec AG, Reinach (CH)

( * ) Notice: Subject to any disclaimer, the term of this patent is extended or adjusted under 35 U.S.C. 154(b) by 452 days.

(21) Appl. No.: 12/993,043

(22) PCT Filed: Apr. 22, 2009

(86) PCT No.: PCT/EP2009/054768
§ 371 (c)(1),
(2), (4) Date: Nov. 16, 2010

(87) PCT Pub. No.: WO2009/138315
PCT Pub. Date: Nov. 19, 2009

(65) Prior Publication Data
US 2011/0062942 A1 Mar. 17, 2011

(30) Foreign Application Priority Data
May 16, 2008 (DE) .......................... 10 2008 001 832

(51) Int. Cl.
*G01R 19/00* (2006.01)
(52) U.S. Cl.
USPC ........................................ 324/76.11; 324/647
(58) Field of Classification Search
None
See application file for complete search history.

(56) References Cited

U.S. PATENT DOCUMENTS

| 4,086,570 A | * | 4/1978 | Wakasa et al. | ............. | 340/13.37 |
| 5,382,912 A | * | 1/1995 | Blain | ............................ | 324/713 |
| 7,098,798 B2 | | 8/2006 | Huisenga | | |

FOREIGN PATENT DOCUMENTS

| EP | 1 860 513 A2 | 11/2007 |
| WO | WO 2009/138315 A1 | 11/2009 |

OTHER PUBLICATIONS

English translation of the IPR.
German Search Report, 2010.
International Search Report, 2009.

* cited by examiner

*Primary Examiner* — Minh N Tang
(74) *Attorney, Agent, or Firm* — Bacon & Thomas, PLLC (57) ABSTRACT

A measuring device with at least one control unit and an electrical current controller. The measuring- and operating electronics is connected to a current loop and the control unit is connected with the electrical current controller and provides the electrical current controller a reference input. The reference input corresponds to a desired value of the measurement signal current and the electrical current controller is suppliable with a primary feedback signal. The primary feedback signal corresponds to an actual value of the measurement signal current set in the current loop. The electrical current controller outputs a control signal formed from a control error signal, wherein at least one evaluation unit is provided, which compares at least one value of the control signal output by the electrical current controller with at least one reference value. The comparison indicates whether the value of the control signal exceeds or subceeds the reference value.

13 Claims, 7 Drawing Sheets

MEASURING DEVICE WITH A MEASURING- AND OPERATING ELECTRONICS FOR MONITORING A MEASUREMENT SIGNAL

TECHNICAL FIELD

The invention relates to a measuring device with a measuring- and operating electronics, wherein the measuring- and operating electronics serve for determining and/or monitoring at least one measurement signal of a physical and/or chemical, measured variable of a measured substance, wherein the measuring- and operating electronics has at least one control unit and an electrical current controller, wherein the measuring- and operating electronics is connected to a current loop, wherein a measurement signal current in the current loop represents a measured value of the measured variable, wherein the control unit is connected with the electrical current controller and provides a reference input to the electrical current controller, wherein the reference input corresponds to a desired value of the measurement signal current, wherein the electrical current controller is fed a primary feedback signal, wherein the primary feedback signal corresponds to an actual value of the measurement signal current set in the two-conductor-current loop, wherein the primary feedback signal and/or the reference input are connected to an input of the electrical current controller, and wherein the electrical current controller outputs a control signal formed from a control error signal between the primary feedback signal and the reference input.

BACKGROUND DISCUSSION

A standard widely used in industry for transmission of measurement signals of a physical and/or chemical, measured variable is an electrical current loop. In such case, the measured value of the physical and/or chemical, measured variable corresponds to an electrical current set in the current loop between 4 milliampere (mA) and 20 mA.

Due to drifting and inaccuracies, a somewhat larger electrical current range is permitted, for example, an electrical current between 3.8 mA and 20.5 mA. Electrical currents smaller than 3.6 mA, or greater than 21 mA should not be interpreted by evaluating units as a variable corresponding to the measured value. An electrical current set in the current loop smaller than 3.6 mA or greater than 21 mA is, consequently, identified as error current.

Field devices, especially measuring devices, which have an electrical current requirement of less than 3.6 mA, can be supplied with energy from the current loop. These so-called two-conductor measuring devices (2 L measuring devices) must be connected via a line with only two conductors. Via the two-conductor current loop (2L current loop), the field device is connected with an electrical current source and/or with a process control station. Field devices with a higher electrical current consumption must be supplied with additional, auxiliary energy.

Often it is required, besides the analog electrical signal, to transfer yet other information, for example, calibration-, parameter data, operating temperature and -voltage, etc. via the 2L current loop. In order to transfer this information, a higher frequency signal is superimposed on the measurement signal. A protocol for the transmission of such information is, for example, the HART (Highway Addressable Remote Transducer) protocol.

The analog measurement signal current set in the 2L current loop is, most often, controlled by a control loop in the 2L current loop. In such case, at least one part of the measuring- and operating electronics part is the control loop. For purposes of control, the primary feedback signal of the measuring- and operating electronics corresponding to the actual value of the measurement signal current is read back and compared with the reference input corresponding to the desired value. Usually, the reference input is output from a control unit. The control unit issues the reference input corresponding to measurement signals from a measuring transducer or sensor. In the case of a measured value change, the set actual value in the 2L current loop differs from the desired value. From the control error signal between the actual value and the desired value, the corresponding control signal is produced, by means of which the measurement signal current in the 2L current loop is changed.

In the case of many applications, the size of the transmitted measurement signal can have considerable influence on the surroundings of the measuring device and/or the environment. Especially, in the case of chemical and environment endangering processes, in the case of which a measured value of temperature, to fill level, pressure, flow or composition of a measured substance is transmitted, a safe running of the process is decisive. Therefore, it is extremely important, that the transmitted measurement signal actually correspond to the measured value. Devices and systems in safety-relevant applications must, consequently, satisfy special requirements, among other things, fulfill the standards for functional safety (e.g. iEC 61506, IEC 61511 etc.). Central component of the standards for functional safety is the so-called safety integrity level (SIL). Depending on the danger emanating from a process or a plant, a corresponding SIL-capability is required for an application. The SIL specifies, with which probability an arising defect of a device or an application is detected. In such case, one distinguishes between a SIL of 1 to 4, wherein 1 is the lowest and 4 the highest safety level.

From Offenlegungsschrift EP 1 860 513 a circuit is known, which assures, that an electrical current set in a current loop corresponds to the actual value of the measured variable to be represented. The circuit relies on the redundant setting of the value of the loop current and a monitoring of the same. While redundantly designed, electrical, electronic and/or electronically programmable components used in the state of the art do, in given cases, increase the functional safety of equipment, there is, nevertheless the disadvantage of increased manufacturing costs for the redundant design of the system and the components.

Furthermore, known from U.S. Pat. No. 7,098,798 B2 is a circuit for monitoring an electrical current in a 2L current loop. For such purpose, the voltage drop across a resistor is measured by means of an evaluating circuit. A disadvantage is that the resistor is not monitored and a malfunction stemming from the resistor is not recognized.

SUMMARY OF THE INVENTION

An object of the invention, therefore, is to provide a cost effective measuring device with improved functional safety.

The object is achieved according to the invention by the features that at least one evaluation unit is provided, that the evaluation unit compares at least one value of the control signal output by the electrical current controller with at least one reference value, and that the comparison shows whether the value of the control signal exceeds, or subceeds (falls beneath), the reference value. The proposed evaluation unit makes it possible to detect the deviation of the control signal from a reference value or the exceeding or subceeding of the control signal over or under a predetermined reference value. If, especially, two different reference values are provided, it is then detectable, whether the control signal exceeds or subceeds one of the reference values, or lies in a region between the reference values. The output signal of the evaluation unit tells us whether the control signal lies between the reference values or exceeds or subceeds one or both reference values. Since defects or disturbances of the measuring- and operating electronics often show themselves in an abnormal measurement signal, for example, through excessive or lessened voltages and electrical currents, the evaluation unit of the invention enables a detection of such abnormal deviations.

In an advantageous embodiment, the evaluation unit issues at least one output signal. The output signal tells us that the control signal has exceeded or subceeded a predetermined reference value. Starting from the output signal of the evaluation unit a deviation or an exceeding or subceeding of the control signal from the reference value can be signaled or corresponding measures taken.

In an advantageous embodiment, the measuring device or the measuring- and operating electronics includes a control element, wherein the control element sets the measurement signal current in the current loop by means of the control signal output by the electrical current controller. For such purpose, the control signal output by the electrical current controller or a corresponding variable is fed to the control element, for example, a transistor, via a turn-on means. The control element then sets a corresponding measurement signal current in the current loop. Via the control element, also the electrical current supply and the energy requirements of the other components of the measuring device and the measuring- and operating electronics, which require an energy supply, are controlled. The current loop is, for example, a two-conductor current loop (2L current loop).

In an advantageous further development, the control unit is the evaluation unit or part of the evaluation unit. If the control unit has, for example, an analog input, then the control signal can be directly evaluated by the control unit. For such purpose, the control signal output by the electrical current controller is transmitted to the control unit. The evaluation, especially the comparison, of the control signal with the at least one reference value, is executed by means of internal components, circuits and/or algorithms contained in the control unit. Via an external analog/digital converter, the control signal can be digitized and so be brought also to a digital input of the control unit.

In an additional advantageous further development, the evaluation unit issues the output signal to the control unit. Especially, when the evaluation unit is not the control unit or part of the control unit, then the output signal provided by the evaluation unit is fed to the control unit and the control unit evaluates the output signal and initiates suitable measures, for example, for maintaining safety.

In an additional advantageous further development, the electrical current controller includes at least one comparator, wherein the comparator determines the control error signal. The comparator is a functional unit, which determines the control error signal from the reference input and the primary feedback signal. The control error signal is, for example, the difference between the primary feedback signal corresponding to the actual value of the measurement signal current and the reference input corresponding to the desired value of the measurement signal current.

In an additional advantageous further development, the electrical current controller includes at least one operational amplifier. Depending on choice and connection of the components, the operational amplifier can perform various linear and non-linear operations, such as, for instance, amplify, take the logarithm of or integrate, compare a plurality of signals, add, subtract or act as a threshold switch, especially as a comparator, serve. The variables formed by means of these operations can serve as control signal for the measurement signal current to be controlled. The operational amplifier in the case of suitable connection finds the difference between the signals on its inverting and non inverting inputs nearly instantaneously and outputs the difference amplified.

In an additional advantageous further development, the comparator is connected electrically with an input of the operational amplifier, and the operational amplifier produces based on the control error signal the control signal and outputs the control signal. The control error signal can be ascertained, for example, by bringing together the primary feedback signal and the reference input at a summation point. A summation point is a node of an electrical network. The signal coming out of the summation point then corresponds, for example, to the difference between reference input and primary feedback signal. In such case, the reference input and/or the primary feedback signal is an electrical voltage or an electrical current corresponding to the actual and/or the desired value. The control error signal output from the summation point in the operational amplifier is then the voltage difference between reference input and primary feedback signal. The operational amplifier is embodied, for example, as an inverting amplifier. The control error signal lies on a first input of the operational amplifier and on a second input there lies a reference voltage, for example, ground (0 V) or a suitable reference potential. The first input is the inverting and the second the non inverting input of the operational amplifier. In the case of such a connection, the operational amplifier outputs as control signal the difference between the control error signal and reference potential.

In an additional advantageous further development, the operational amplifier is supplied with an operating voltage and has a working range, wherein the working range lies below the operating voltage. The operational amplifier is often operated symmetrically with two identical direct voltages, for example, ±5 V, ±12 V and ±15 V. An option is also a connection of the first operating connection with only one direct voltage. The second operating connection is then connected with ground or the reference potential. The working range of the operational amplifier lies between the upper operating voltage and the lower operating voltage. In such case, the working range is so designed, that the control signal in the case a defect free measuring- and operating electronics, or of a defect free measurement signal lies within the working range the operational amplifier. Furthermore, the working range is so designed, that the control signal sets a measurement signal current between, for example, 4 mA and 20 mA, without leaving the working range of the operational amplifier. A measured value change from the minimum measured value to the maximal measured value corresponds then to a change of the measurement signal current, from the measurement signal current which represents the minimum measured value, to the measurement signal current which represents the maximal measured value, thus, for example, from 4 mA to 20 mA or 3.8 to 20.5 mA. The working range and the operation of the operational amplifier are so designed, that the operational amplifier does not leave, or leaves only for a short time (for lengths of time in the millisecond range), its working range in the case of a maximal measured value change.

In an additional advantageous further development, the control signal leaves the working range of the operational amplifier, in the case, in which the difference between reference input and primary feedback signal is not, after a predetermined time span, approximately zero. In defect free control operation, the control unit outputs the reference input, wherein the reference input corresponds to the desired value of the measurement signal current. The reference input and the primary feedback signal is transmitted to the electrical current controller. The primary feedback signal corresponds to the actual value of the measurement signal current set in the 2L current loop. In the case of a measured value change to be adjusted, primary feedback signal and reference input, i.e. actual and desired values, are not identical and on the input of the operational amplifier lies a control error signal unequal to zero. The operational amplifier outputs a control signal corresponding to the control error signal almost instantaneously. The delay time lies typically in the microsecond range ($10^{-6}$ s). Correspondingly, the reference input establishes itself in the 2L current loop and the control error signal between actual and desired values goes toward zero. If, in contrast, there is an error or defect, then the control error signal does not disappear, but, instead, there is still a voltage difference between the inputs of the operational amplifier. Since the operational amplifier functioning as electrical current controller cannot erase the voltage difference, it overshoots and leaves its working range. The time span, after which the operational amplifier leaves its working range, is determined by the characteristics of the used components, such as, for example, operational amplifier, capacitors and resistors.

In an additional advantageous further development, in the case in which the control signal lies outside the working range of the operational amplifier, the control signal approximately equals the operating voltage of the operational amplifier. If the operational amplifier leaves its working range due to a voltage difference present between the signals lying on its inputs and the operational amplifier cannot erase the voltage difference, then the operational amplifier enters into its (upper or lower) saturation region. The saturation region corresponds, in such case, approximately to the (upper or lower) operating voltage of the operational amplifier, wherein the saturation voltage deviates from the operating voltage, since, in the case of a real-life operational amplifier, voltage and other losses occur.

In an additional advantageous further development, the at least one reference value lies above, or below, the working range of the electrical current controller. Through such a choice of the reference values, deviations of the control signal from the working range are detected.

In an additional advantageous further development, the evaluation unit is partially a comparator circuit and/or an analog-digital converter. A comparator circuit, for example, a suitably connected operational amplifier, serves for comparison of the control signal with a reference value. The reference value can be derived from the operating voltage of the operational amplifier contained in the electrical current controller, for example, by means of voltage dividers. The comparator then compares the value of the control signal with the reference value and produces a corresponding output signal. Additionally, or alternatively, an analog/digital converter provided, which digitizes the control signal and outputs a corresponding output signal for further processing. Furthermore, a digital comparator can be provided, which compares the digitized control signal with a reference value likewise present in digital form and provides a corresponding value or signal as output signal.

In an additional advantageous further development, the output signal produced by the evaluation unit is a digital signal. Through a digital output signal, is a forwarding and further processing of the output signal in a digital circuit, for example, an integrated circuit, especially a CPU or an ASIC, is possible.

In an additional advantageous further development, the output signal is a bit or n-bits, wherein n is a natural number greater than one. An analog comparator, for example, provides such a bit output signal. In the evaluation unit, an analog/digital converter can be provided. Such an analog/digital converter produces an n-bit output signal.

In an additional advantageous further development, the control unit outputs a signal, especially an error signal, corresponding to the output signal of the evaluation unit. Starting with the output signal of the evaluation unit, which, for example, is fed to the control unit, a corresponding signal is sent on the further measuring- and operating electronics. In such case, the signal can be, for example, an OK-signal, an error-signal or another open or closed loop, control signal. The corresponding signal, especially the error signal, is, for example, only issued, when the control signal exceeds or subceeds one of the reference values. The error signal then triggers, for example, an error current in the 2L current loop. Depending on error signal, the error current can be a high- or low-alarm, i.e. an error current of more than 20.5 mA or less than 3.6 mA.

In an additional advantageous further development, the control unit triggers the error signal, when the control signal exceeds or subceeds the reference value longer than a predetermined time span, especially approximately a second. In the control of the measurement signal current, short-time exceedings or subceedings of the reference value or values can occur. The predetermined time span, after which an error signal is output, can be selected, for example, corresponding to a NAMUR recommendation, a standard or a specified norm.

The circuit of the invention detection, among other things, defects, which arise from the following factors and which result in a corrupted measurement signal:
  wrong or defective specification of system components, hardware or software;
  a statistical hardware defect or failure;
  a systematic hardware or software defect;
  a human error;
  environmental influences, especially atmospheric, electromagnetic, calorimetric and/or mechanical influences; and
  disturbances of power supply system, e.g. voltage fluctuations or voltage loss.

Another opportunity for transmission of measurement signals are serial fieldbus-systems, e.g. Profibus PA and Foundation Fieldbus FF. These are often also implemented as 2-conductor field devices, especially 2L measuring devices, in the case of which the energy supply is provided from the current loop. In contrast to 2L measuring devices with current loop (e.g. with a measurement signal current between 4 and 20 mA representing a measured value), the set electrical current is constant and does not correspond to the measured value. Measuring- and control signals are transmitted digitally e.g. by means of Manchester-encoding. I.e., also fieldbus systems are equipped with an electrical current controller. This value must be known for dimensioning the bus system, since the energy supply occurs together for a number of devices. An incorrect electrical current can lead to loss of the entire bus system or to its becoming unstable. It is thus advantageous to monitor the set electrical current. The operation of the electrical current monitoring occurs as in the case of the above described current loop.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
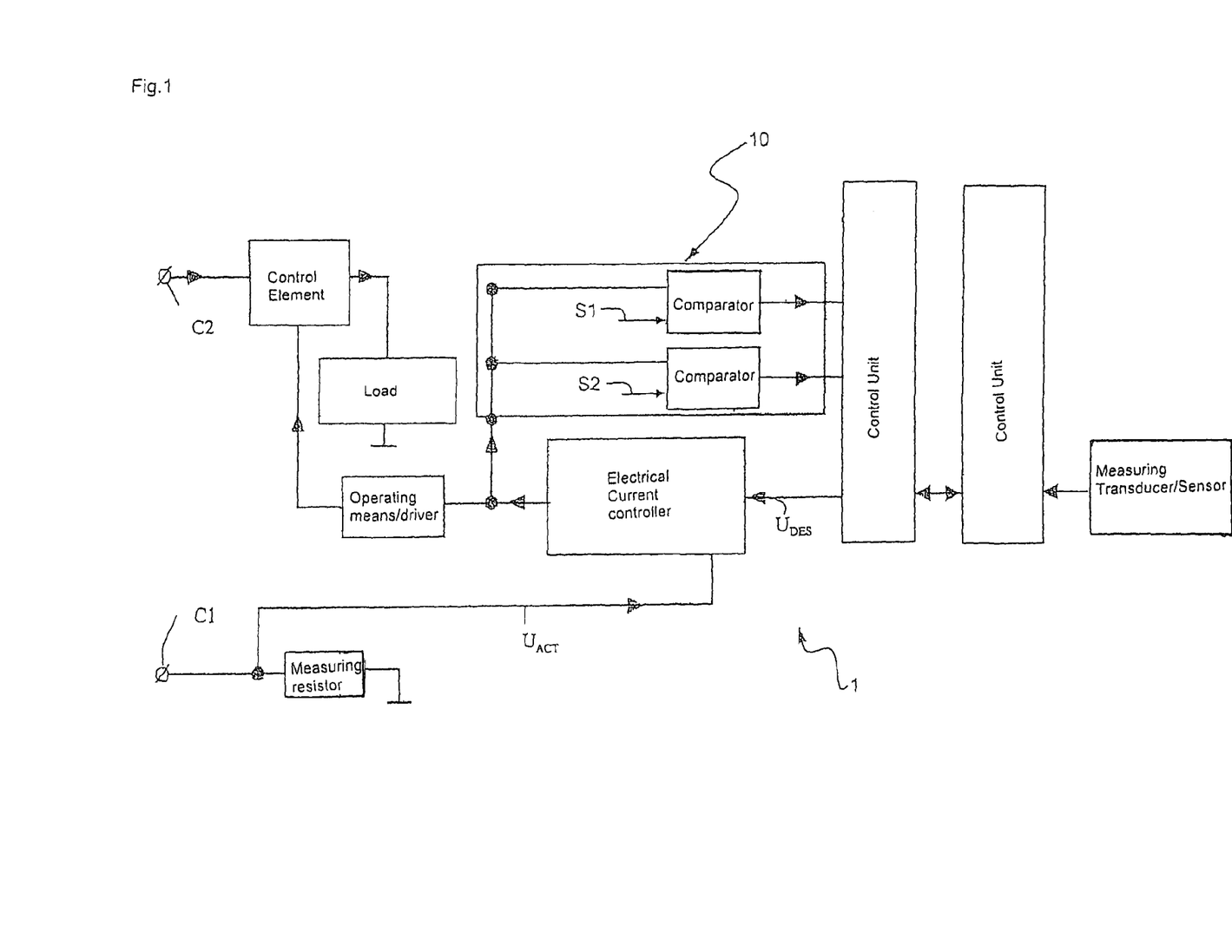
FIG. 1 is a schematic representation of a circuit diagram of a first form of embodiment of the measuring- and operating electronics of the invention.

FIG. 1 shows a schematic representation of the measuring- and operating electronics 1 of the invention. The measuring- and operating electronics 1 is connected via two connections C1, C2 to a data-transmission system, via which both an electrical current as well as also process relevant data are transmittable. The data-transmission system is, for example, a two-conductor current loop (2L current loop). Via the 2L current loop, the measuring- and operating electronics 1 is, for example, connected to a process control system having a process control computer and/or to an energy-, or direct current source, which supplies the measuring device with a voltage, or an electrical current. The electrical current transmitted via the 2L current loop lies between, for example, 4 and 20 mA, or 0 and 20 mA.

The measuring- and operating electronics 1 is part of a measuring device, which is connected to the 2L current loop. The measuring device is, for example, a field device and/or a measuring device of process automation technology, which serves for recording a pressure, a fill level, a flow rate, a temperature and/or an analysis of a measured substance.

The shown output circuit is part of the measuring- and operating electronics 1 and is essentially composed of an electrical current control circuit, which controls the electrical current set in the 2L current loop. The electrical current control circuit is composed essentially of a control unit IC, an electrical current controller ECC, a control element CE, a operating means O of the control element CE and the connections C1, C2 to the 2L current loop and the 2L current loop (not shown).

Connected to the shown measuring- and operating electronics 1 is the actual supply electronics of the measuring device. The supply electronics is shown symbolically in FIG. 1 by the load L. The supply electronics includes, for example, an actuator, a sensor and the other components of the measuring device, which require an energy supply.

Placed in front of the output circuit is a measuring transducer/sensor S. The measuring transducer/sensor S serves to determine a measured value of a measured variable and to associate an electrical measurement signal with the measured variable. The raw data output by the measuring transducer/sensor S are further processed by a first control unit IC to a measurement signal.

The electrical measurement signal is fed to a control unit IC. The control unit is, for example, a central processing Unit (CPU) or a Application Specific Integrated Circuit (ASIC). A component of the control unit IC can be a memory unit, for example, in the form of a read only memory (ROM) or random Access memory (RAM).

The measurement signal supplied to the control unit IC is processed by such and a corresponding reference input $U_{DES}$ output. The reference input $U_{DES}$ corresponds to the desired value of the measurement signal current to be set in the 2L current loop. The measurement signal received by the control unit IC is a digital or analog signal. The desired value output by the control unit is an analog voltage signal. The control unit is connected with the electrical current controller and transmits the reference input $U_{DES}$ to an input of the electrical current controller.

The measurement signal current set in the 2L current loop, or a signal derived from the measurement signal current, is fed to the electrical current controller ECC as primary feedback signal $U_{ACT}$. The primary feedback signal $U_{ACT}$ corresponds to an actual value of the measurement signal current set in the 2L current loop. For such purpose, the measurement signal current is read back and the primary feedback signal likewise led to an input of the electrical current controller ECC. The primary feedback signal $U_{ACT}$ is, for example, a voltage corresponding to the actual value.

At least one measuring resistor M is provided, across which a voltage corresponding to the actual value of the measurement signal current falls.

Figure 6:
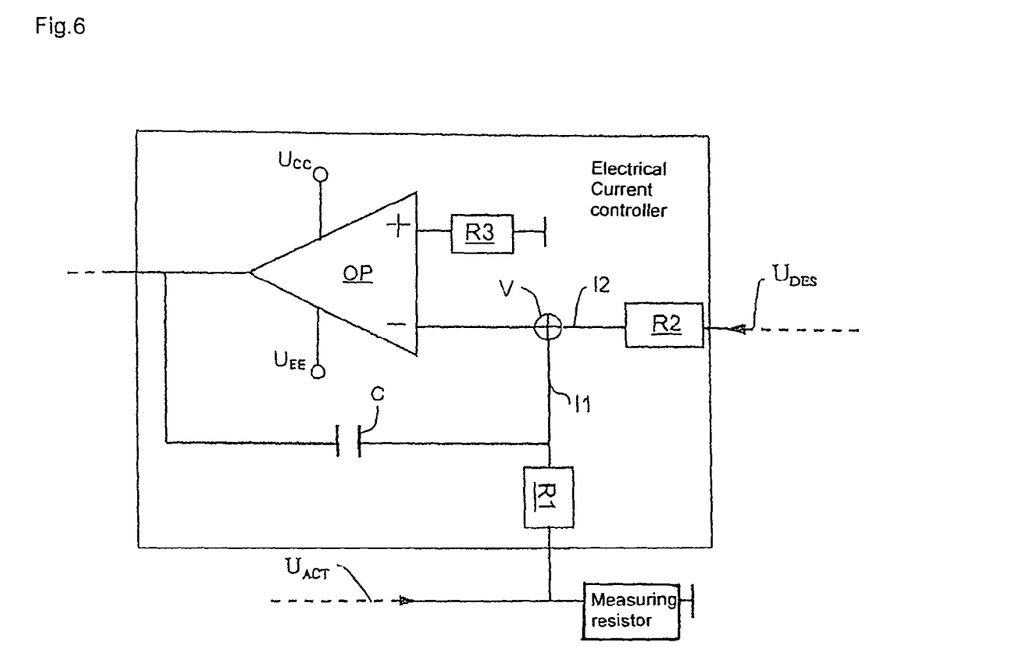
FIG. 6 is a schematic representation of an electrical current controller.

Reference input $U_{DES}$ and primary feedback signal $U_{ACT}$ of the measurement signal current are, for example, applied to the same input or to different inputs of the electrical current controller ECC. This is dependent on the concrete construction and the operation of the electrical current controller ECC. FIG. 6 shows a possible construction of an electrical current controller ECC.

The electrical current controller ECC derives from the reference input $U_{DES}$ and the primary feedback signal $U_{ACT}$ a control error signal. The control error signal is, for example, the difference between the reference input $U_{DES}$ and the primary feedback signal $U_{ACT}$. A simple electrical current controller ECC can, thus, be implemented by means of a suitably connected operational amplifier OP. Such an electrical current controller ECC is supplied with at least one operating voltage $U_{EE}$, $U_{CC}$ and has a working range. The working range and the electronic circuit are, in such case, so designed, that a measurement signal current corresponding to a measured value can be controlled of the control signal, wherein the control signal, in such case, lies within the working range.

This control signal output by the electrical current controller ECC is transmitted to the operating means O of the control element CE. The operating means O correspondingly controls the control element CE, for example, an output transistor. The control element CE then sets a measurement signal current in the 2L current loop.

According to the invention, the control signal output by the electrical current controller ECC is fed to an evaluation unit 10. In FIG. 1, an evaluation unit 10 is provided with two comparator circuits K1 and K2. The control signal is fed to the comparators K1, K2. On a first comparator K1 lies a first reference value S1 and on a second comparator K2 a second reference value S2. The comparator circuit can be, for example, an analog comparator circuit, which essentially is composed of at least one suitably connected operational amplifier. The comparators K1, K2 tell whether the control signal lies over or under the respective reference values S1, S2 and output corresponding signals to the control unit IC. The signals output by the evaluation unit are, for example, the respective upper or lower saturation voltages of the operational amplifiers K1, K2 connected as comparators. The control unit IC receives the signals and can, corresponding to an evaluation routine, issue an OK-signal or an error signal. In control operation, the desired value of the measurement signal current predetermined by the control unit IC by means of the reference input $U_{DES}$ is set in the 2L current loop. The desired value corresponds to a measured value recorded from a measuring transducer/sensor S. The reference input $U_{DES}$ and the primary feedback signal $U_{ACT}$ are fed to the electrical current controller ECC, for example, by an electrical current or voltage corresponding the desired value or actual value, respectively. Thus, there are installed in the signal paths of the primary feedback signal $U_{ACT}$ and the reference input $U_{SOLL}$ resistors, which care for a suitable transforming of electrical current into voltage or vice versa.

Figure 8:
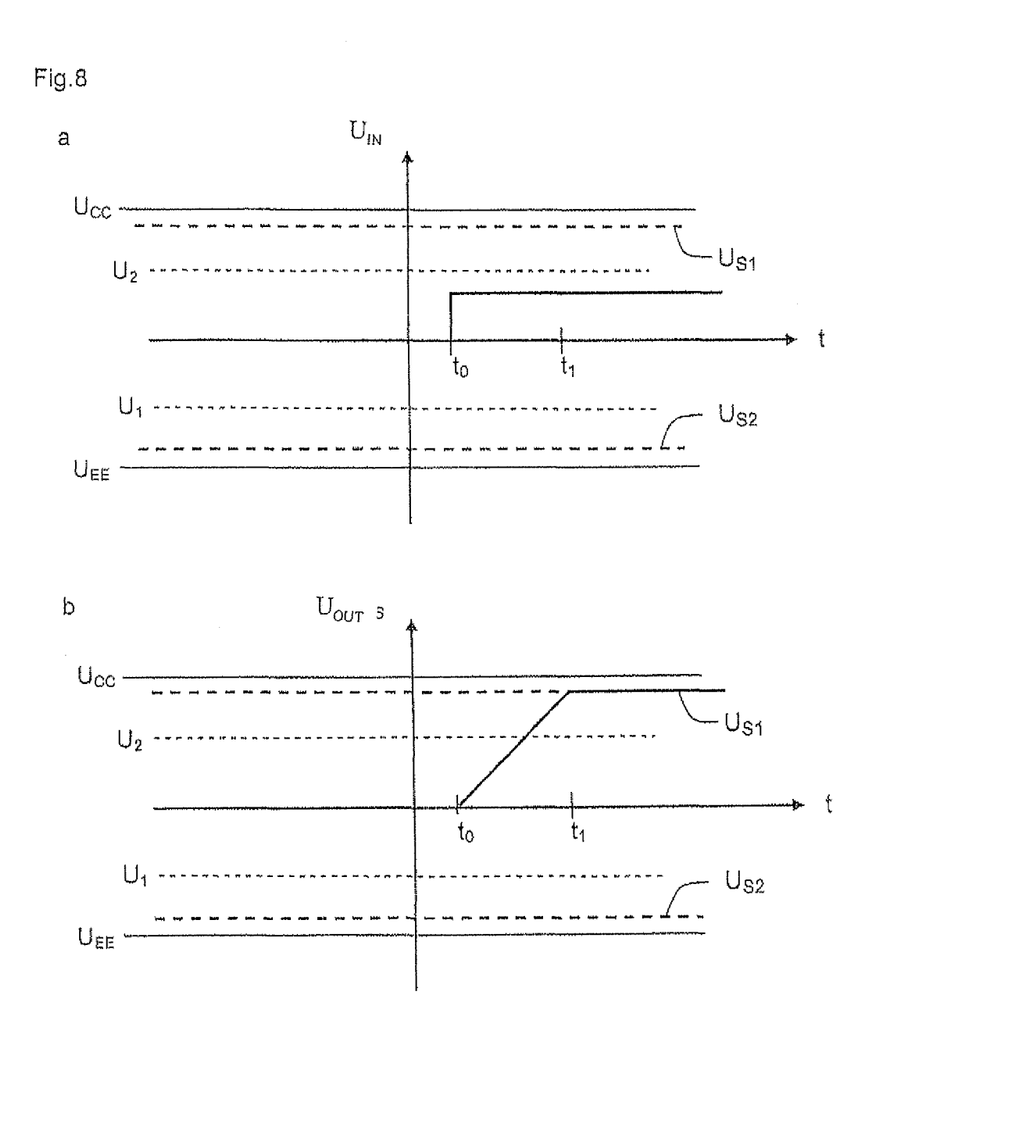
FIG. 8 shows input and output signals of an operational amplifier connected as an integrator.

The electrical current controller ECC is essentially composed of an operational amplifier OP, which is supplied with an operating voltage $U_{EE}$, or $U_{CC}$. The electrical current controller ECC produces a control signal, which determines the measurement signal current to be set by the output transistor CE. In the case of defect free operation, the control signal lies within the working range of the operational amplifier OP. If the control signal leaves the working range, this is signaled by the comparators K1, K2 of the evaluation unit 10 by a corresponding output signal. The corresponding output signal is a voltage output by the comparators K1, K2. The electrical current controller shows a defect by the fact that it leaves its working range provided for control operation. FIG. 8 shows such a situation.

The working range of the operational amplifier OP is exactly so set, that it controls a measurement signal current in the 2L current loop within a predetermined time (usually in the millisecond range). For a short time, in such case, exceeding of the working range can occur.

The control element CE sets the control signal output by the electrical current controller ECC in the 2L current loop. Actual value and desired value of the measurement signal current and, consequently, also reference input $U_{DES}$ and primary feedback signal $U_{ACT}$ then agree.

If, in contrast, a defect, a disturbance or other error is present, then the reference input $U_{DES}$ differs durably from the primary feedback signal $U_{ACT}$. The electrical current controller ECC attempts to erase this control error signal and overshoots, in such case, since the control error signal caused by the defect is not cancelled by a change of the control signal. The operational amplifier OP of the electrical current controller ECC transfers into its saturation voltage. Depending on whether a positive or negative difference between reference input $U_{ACT}$ and primary feedback signal $U_{DES}$ is present, the operational amplifier OP transfers to the upper or lower saturation voltage. FIG. 8 shows the curve of the control signal in the case of a constant, non disappearing, control error signal.

The control signal is tapped and fed to the evaluating circuit, which includes two comparators K1, K2. The two comparators K1, K2 compare the control signal with, in each case, a reference value S1, S2. For such purpose, there is applied to the comparator K1 a reference value S1, which lies above the working range of the operational amplifier OP. At the second comparator K2, the control signal is compared with a reference value S2, which lies below the working range of the operational amplifier OP. Depending on whether the control signal lies above or below the reference value S1, S2, the comparator K1, K2 composed of an operational amplifier OP transfers into its upper or lower saturation region. Depending on the output saturation voltage, it can be determined, whether the control signal lies above, below or within the region predetermined by the reference values S1, S2. The signals output by the comparators K1, K2 possess digital character, so that by means of the signals a digital circuit can be addressed. These one bit valued, digital signals are fed to the control unit IC.

An option is also the application of a memory unit, for example, a RAM or ROM, which communicates with a control unit IC. The control unit IC queries the control signal corresponding to a monitoring routine and evaluates it. If the control signal lies, for example, longer than 1 s outside the working range, then a defect signal is output and an defect current set in the 2L current loop.

An incorrect measurement signal current in the 2L current loop can arise, among other things, due to damage to the electrically conductive traces or a defective voltage supply. Defects are often the result of corrosive influences from the environment of the measuring device or defective solder locations.

Figure 2:
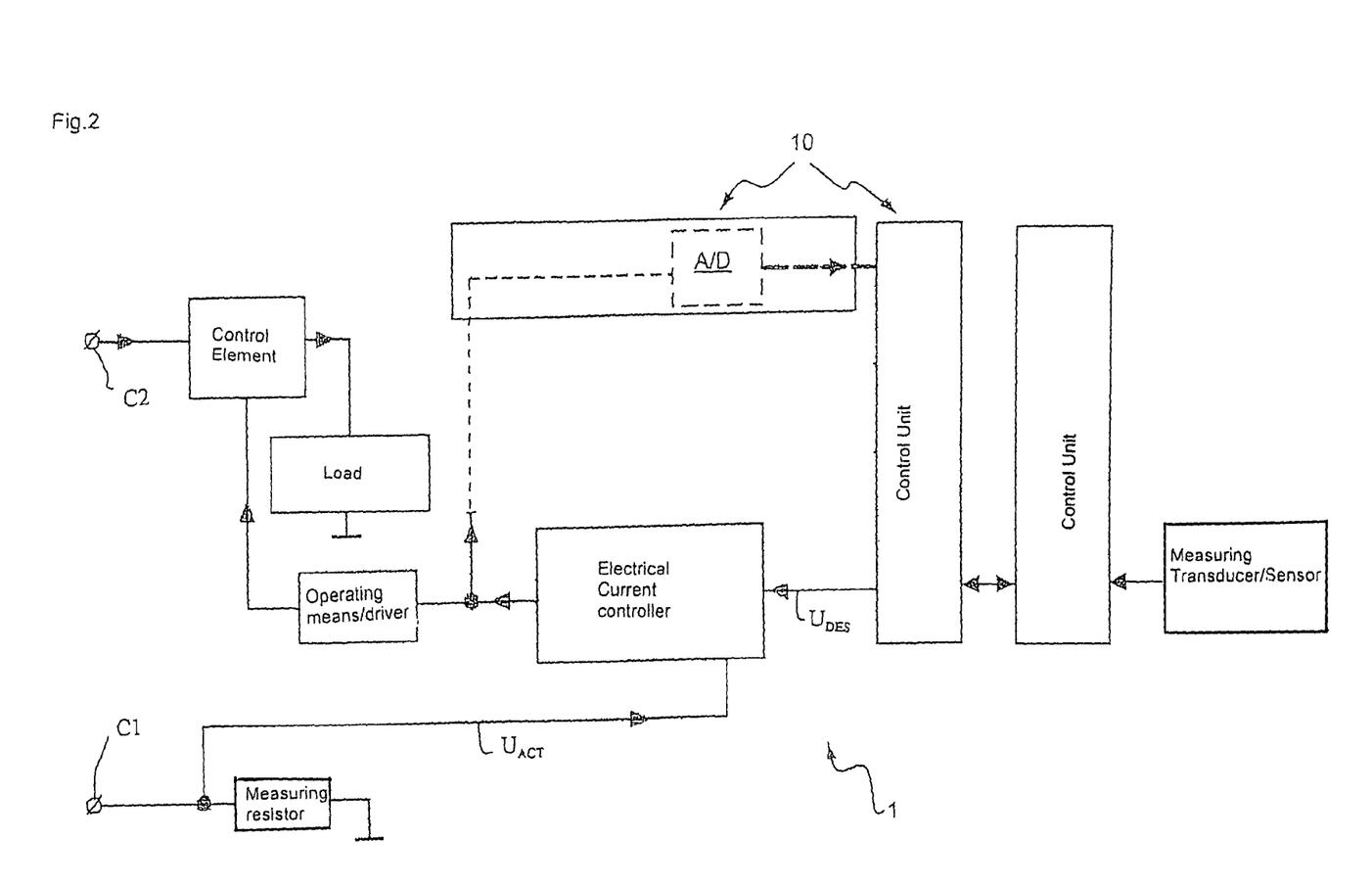
FIG. 2 is a schematic representation of a circuit diagram of a second form of embodiment of the measuring- and operating electronics of the invention.

FIG. 2 shows another form of embodiment of the measuring- and operating electronics of the invention. In this form of embodiment, the evaluation unit 10 is essentially composed of an external analog/digital converter A/D and the control unit IC. The remainder of measuring- and operating electronics 1 corresponds to that illustrated in FIG. 1. The control signal is fed to the analog/digital converter A/D and digitized. Transmitted tn the control unit IC is an n bit valued, digital signal, which corresponds to the control signal. The n bit valued digital signal is compared by the control unit IC with a reference value S1, S2. The reference value S1, S2 is, for example, stored in the control unit. Instead of the analog/digital converter A/D or supplementally, a digital comparator can be provided, which compares a digital signal corresponding to the control signal, for example, bitwise with a digital reference value.

Figure 3:
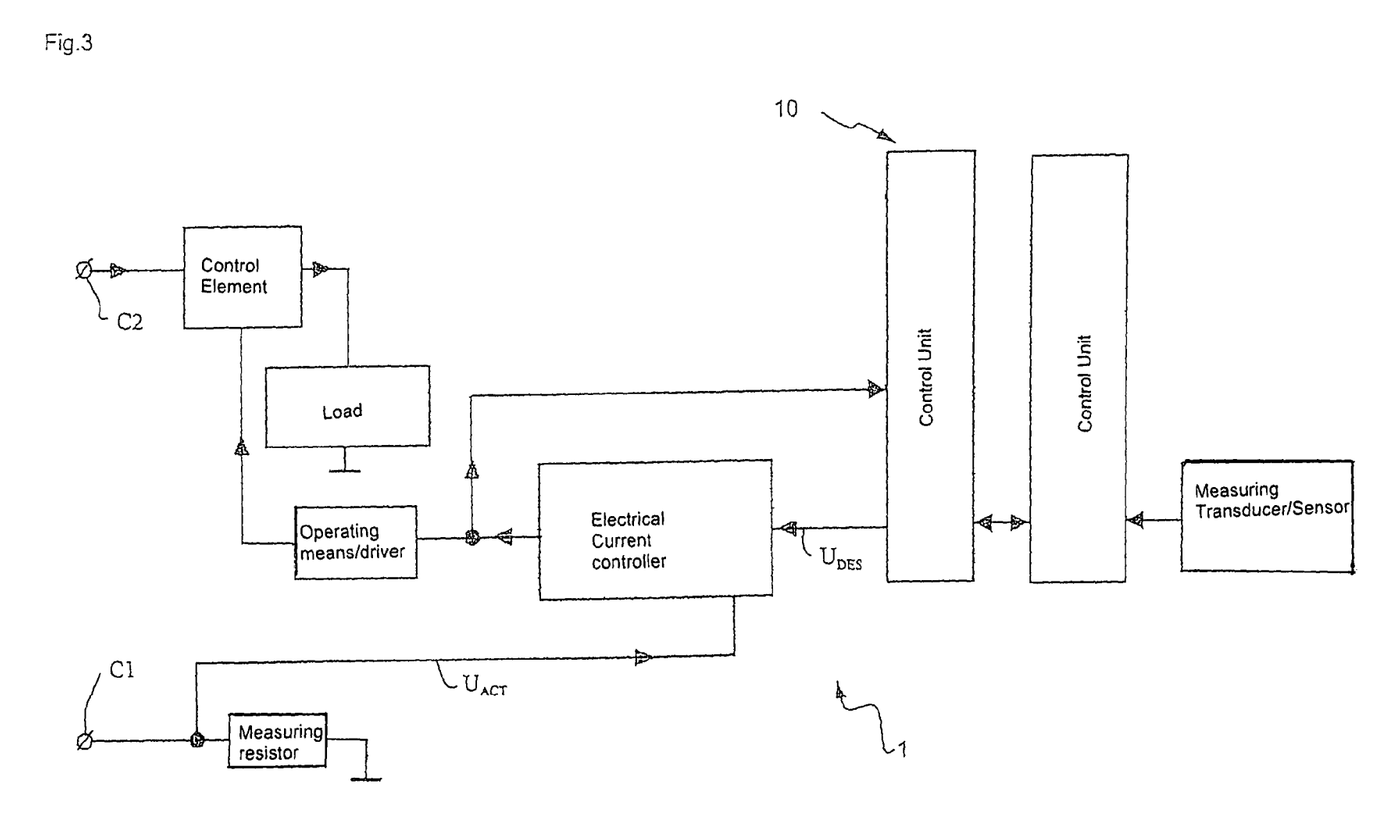
FIG. 3 is a schematic representation of a circuit diagram of a third form of embodiment of the measuring- and operating electronics of the invention.

FIG. 3 shows another form of embodiment of the measuring- and operating electronics of the invention 1. The control signal is transmitted via a signal path directly to an analog input of the control unit IC. The remaining measuring- and operating electronics 1 corresponds to that illustrated in FIG. 1. The evaluation—the comparison of the control signal with at least one reference value S1, S2—occurs then by means of the control unit IC, i.e. the control signal is digitized and compared with at least one reference value S1, S2.

Figure 4:
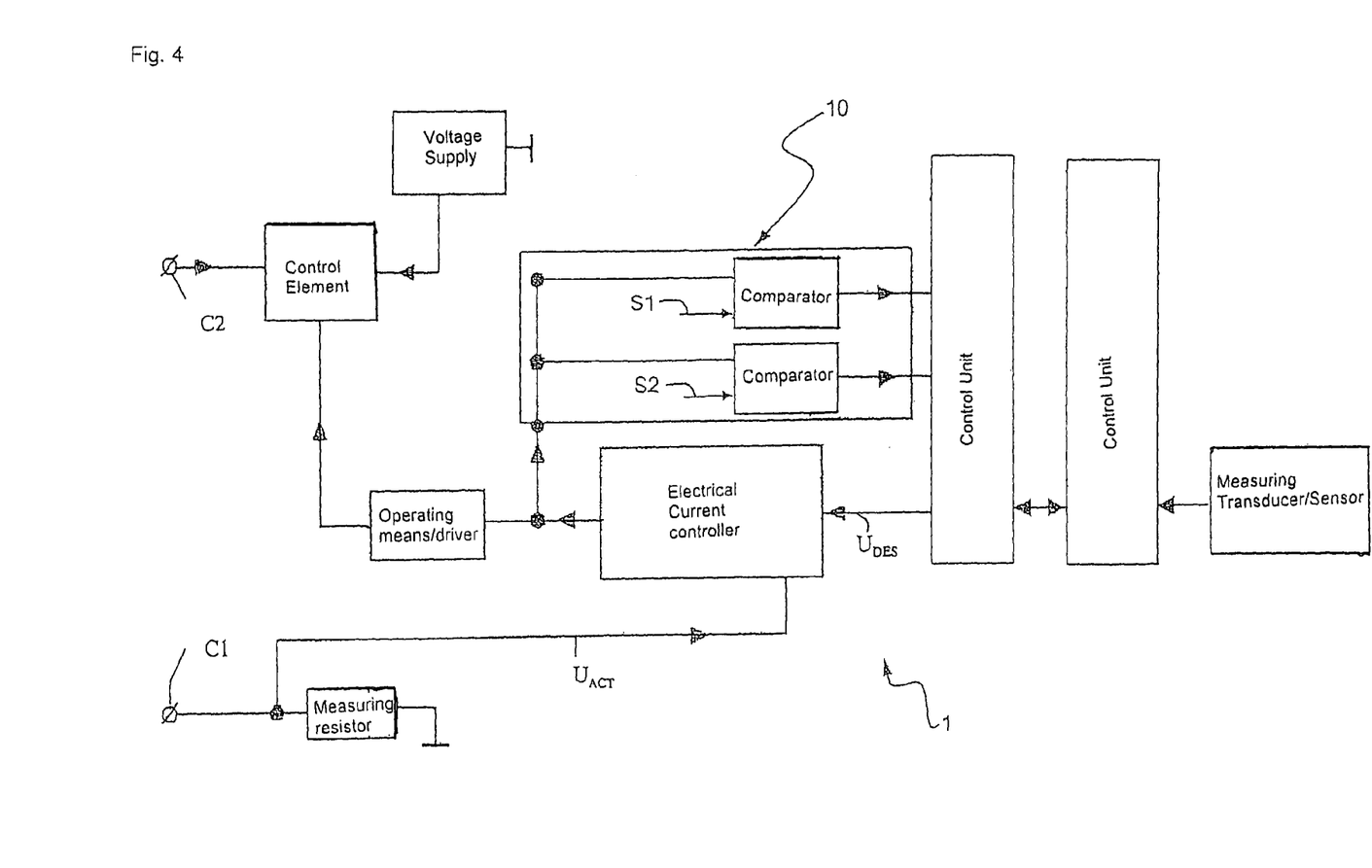
FIG. 4 is a schematic representation of a circuit diagram of a form of embodiment of the measuring- and operating electronics of the invention in the case of a four-conductor device.

FIG. 4 shows the measuring- and operating electronics 1 of a four-conductor measuring device. The four-conductor measuring device is supplied via at least two electrical lines—not shown—with an (operating-) voltage. Measuring devices, which have an electrical current requirement of more than 3.6 mA, require an additional voltage supply PS. Such measuring devices are generally known under the name four-conductor measuring devices. The electrical current set in the current loop having the connections C1, C2 corresponds, in such case, to a measured value. Also in such case, it is advantageous to monitor the electrical current. The electrical current monitoring occurs as in the case of the measuring- and operating electronics 1 illustrated and explained in connection with FIG. 1, 2 or 3. The evaluation unit 10 can, in such case, be composed of an analog or digital comparator circuit K1, K2, an analog/digital converter A/D and/or the control unit IC.

The voltage supply PS provides typically a voltage of 24 V. The load L is likewise supplied via the voltage supply PS; this is not explicitly shown. The measuring- and operating electronics 1 is connected via the connections C1, C2 to a current loop. In the current loop, the measurement signal current is set representing a measured value. The voltage supply PS is connected with the control element CE and provides the control element CE with a voltage, by means of which a measurement signal current is set in the current loop. The current loop is actively operated. Starting with the control signal, via the operating means O and the control element, a determined measurement signal current is set in the current loop. The operating means O is, in such case, likewise as in FIGS. 1 to 3, not absolutely required. The operating means O is, in such case, essentially composed of a circuit, which includes at least one capacitor, especially a differential capacitor, and electrical resistances.

Figure 5:
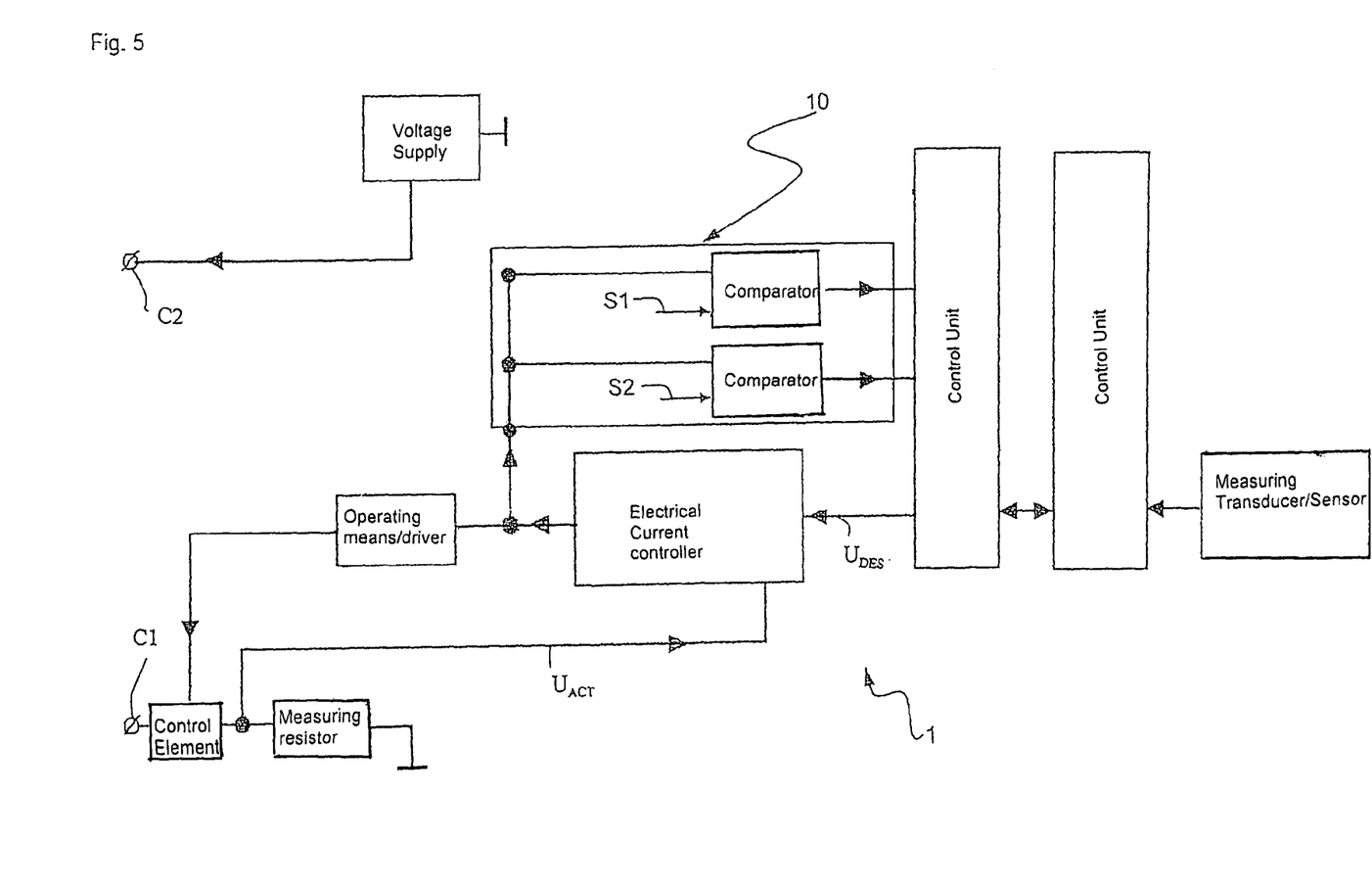
FIG. 5 is a schematic representation of a circuit diagram of an additional form of embodiment of the measuring- and operating electronics of the invention in the case of a four-conductor device.

Due to the present energy of the voltage supply PS, the following operating modes with a measurement signal current representing the measured value are possible for the measuring- and operating electronics 1:
i) 0 to 20 mA, active
ii) 4 to 20 mA, active
iii) 0 to 20 mA, passive
iv) 4 to 20 mA, passive In such case, iv) corresponds to the current loop in the case of 2L devices with 4 to 20 mA, as described in connection with FIGS. 1, 2 and 3. In the case of the active operating mode, the voltage supply is directly connected (s. FIG. 5), or connected at least via the control element (s. FIG. 4), with the current loop. Characteristic for the passive operating mode is that the remaining operating electronics, previously characterized by the load L, is supplied by the voltage supply PS and is not connected with the current loop, which transmits a measurement signal current.

FIG. 5 shows another circuit arrangement of the measuring- and operating electronics 1 of a four-conductor-measuring device. The control element CE is connected at the connection A1 to the current loop and before the measuring resistor M and the electrical current controller ECC. The control element CE is furthermore addressed by the electrical current controller ECC via the operating means O. The voltage supply PS is connected directly with the connection A2.

FIG. 6 shows an option for implementing an electrical current controller ECC. The electrical current controller ECC is essentially composed of a suitably connected operational amplifier OP having a typical amplification factor of 100,000. The primary feedback signal $U_{ACT}$, which corresponds to an actual value of the measurement signal current set in the 2L current loop, is fed to the electrical current controller ECC. A voltage falls across the measuring resistor M and then an electrical current $I_1$ flows via the resistor $R_1$ into the summation point S. The control unit IC sets a voltage corresponding to the reference input $U_{DES}$. Via the resistor $R_2$, there then flows an electrical current $I_2$ into the summation point S. Due to the high input resistance provided on the operational amplifier OP, no electrical current flows, however, into the inverting input (−) of the operational amplifier. Provided as input resistance is typically a resistance of 1 megaOhm ($1 \times 10^6$ ohm), preferably 1 gigaOhm ($1 \times 10^9$ ohm). Applied to the non inverting input of the operational amplifier OP is ground (0 V) as reference potential. The operational amplifier OP attempts to erase the difference between the voltages applied to its inputs (+,−) by amplifying the voltage difference and outputting with opposed poling. The amplified voltage difference is fed back to the inverting input (−). The amplified voltage difference output by the operational amplifier OP corresponds to the control signal and is fed to the operating means O.

The capacitor C serves as memory, which adds up the voltage applied to it over time. Furthermore, the capacitor C reduces the frequency bandwidth of the electrical current controller ECC. Thus is assured, that the electrical current controller ECC functions stably and does not oscillate. The operational amplifier. OP connected by way of the capacitor C as an integrator integrates the difference between the reference input $U_{DES}$ and the primary feedback signal $U_{ACT}$. If there is a difference between reference input $U_{DES}$ and primary feedback signal $U_{ACT}$, the output voltage of the integrator, or the control signal, changes and influences thereby, via the 2L current loop, the difference between reference input $U_{DES}$ and primary feedback signal $U_{ACT}$, such that the difference becomes approximately zero.

The operational amplifier OP is supplied with an upper operating voltage $U_{EE}$ and a lower operating voltage $U_{CC}$ and has a working range, which lies between these operating voltages. The working range is so designed, that a measurement signal current between 4 mA and 20 mA can be controlled by a control signal output from the operational amplifier OP.

If the electrical current controller ECC is supplied, for example, with an upper operating voltage $U_{CC}$ of 3 volt (V) and the lower operating voltage $U_{EE}$ is ground (0 V), then a possible working range lies, for example, between 0.5 V and 2.5 V. The control error signal output by the electrical current controller ECC lies in the normal case, i.e. defect free control operation, within this working range. The working range is, in such case, so designed, that it controls the measurement signal current, for example, between 4 and 20 mA, wherein a 4 mA measurement signal current, for example, corresponds to a lowest fill level and a measurement signal current of 20 mA to a maximum fill level. The electrical current controller ECC is furthermore, for example, so designed, that control of the measurement signal current of 4 mA on 20 mA is possible within milliseconds.

If, for example, 12 mA are set in the 2L current loop, then there falls across the measuring resistor M of 25 ohm 0.3 V. Via the resistor R1 with 25 kOhm ($25 \times 10^3$ ohm) there then flows an electrical current of 12 µA ($12 \times 10^{-6}$ Ampere) into the summation point S. In order that the electrical currents I1 and I2 agree in the summation point S, the control unit must output 1.2 V into the 100 kOhm resistor R2. In this way, a measurement signal current between 4 and 20 mA can be set and output.

If, in contrast, a disturbance, such as, for example, a damaged conductive trace or a damaged connection location is present, leakage currents and voltage drops occur. Due to a defect, the measurement signal current assumes, for example, the value 12.010 mA and a voltage of 0.300250 V falls across the measuring resistor M. The control unit still issues 1.2 V, in order to produce a measurement signal current of 12 mA. At the summation point, there arises, consequently, an error voltage of 200 µV. In the case of a 100,000-times amplification by the operational amplifier OP there results by calculation a control signal of 20 V. The control signal can, however, not assume this value, since the operating voltage of the operational amplifier OP lies at only 3 V. The operational amplifier thus transfers to its saturation $U_{S1}$ voltage, which lies just under 3 V. Through suitable choice of the reference values S1, S2 of the evaluation unit, it can be registered, when the control signal leaves the working range, or transfers to the saturation voltage of the operational amplifier OP. Test have shown that, in this way, a deviation of the measurement signal current of about 1 µA can be noticed.

Figure 7:
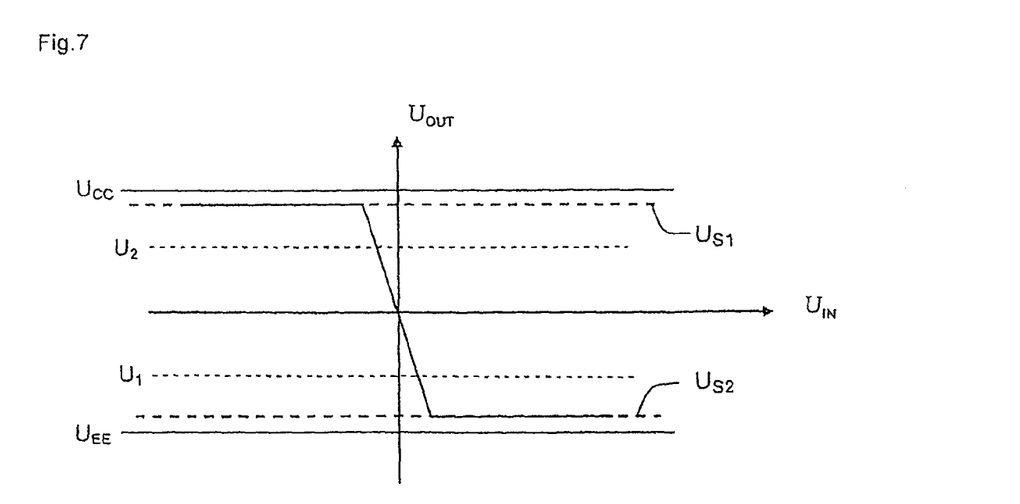
FIG. 7 is a schematic representation of working range and operating voltage of an operational amplifier.

FIG. 7 shows the operating- and working range of an operational amplifier OP. The operational amplifier OP is supplied by an upper operating voltage $U_{CC}$ and a lower operating voltage $U_{EE}$. The upper saturation voltage $U_{S1}$ lies under the upper operating voltage $U_{CC}$. The lower saturation voltage $U_{S2}$ lies over the lower operating voltage $U_{EE}$. The provided design the working range of the operational amplifier OP is characterized by the two voltages $U_1$ and $U_2$. The voltages $U_1$, $U_2$ lie between the upper and lower saturation voltage $U_{S1}$, $U_{S2}$.

The reference values $S_1$ and $S_2$, which are taken into consideration for the evaluation of the control signal, lie, in order to detect an exceeding or subceeding of the control signal over or under the working range, between the voltage $U_2$ and the upper operating voltage $U_{CC}$, or between the voltage $U_1$ and the lower operating voltage $U_{EE}$. The reference values $S_1$, $S_2$ can also be so selected, that they correspond to the voltage $U_1$, or $U_2$ or the upper, or lower saturation voltage $U_{S1}$, $U_{S2}$, FIG. 7 shows furthermore the linear amplification range of the operational amplifier. If the input voltage $U_{IN}$ lies within this linear amplification range, then it is amplified with the amplification factor of the operational amplifier OP. If the input voltage $U_{IN}$ lies outside the linear amplification range, then the upper or lower saturation voltage $U_{S1}$, $U_{S2}$ is output as output voltage of the operational amplifier OP. The upper or lower saturation voltage $U_{S1}$, $U_{S2}$ corresponds to the maximum possible amplification of the operational amplifier OP and is determined by the operating voltage and the internal circuit of the operational amplifier.

FIG. 8a shows the input voltage $U_{IN}$ and FIG. 8b the corresponding output voltage $U_{OUT}$ of the operational amplifier OP of FIG. 6 as a function of time. The operational amplifier OP is connected as shown in FIG. 6 as an integrator and the reference characters correspond to, those of FIG. 7. The output voltage $U_{OUT}$ is essentially the time integral of the input voltage $U_A$. If there is between the inputs of the operational amplifier OP no voltage difference, then the output voltage $U_{OUT}$ also remains constant. Arrising voltage differences are added up and stored by the capacitor C.

At the beginning, the capacitor C is uncharged. FIG. 8a shows from a point in time $t_0$ a constant voltage difference between the inputs of the operational amplifier OP. The input voltage $U_{IN}$ is rectangularly shaped. This voltage difference lies on the inverting input of the operational amplifier OP and corresponds, for example, to the control error signal. The non inverting input lies at ground. The input voltage $U_{IN}$ is output by the operational amplifier OP linearly amplified as output voltage $U_{OUT}$. The capacitor C adds this up, so that in FIG. 8b the illustrated linearly increasing curve results for the output voltage $U_{OUT}$ between $t_0$ and $t_1$. The capacitance of the capacitor C is so selected, that it is not exceeded in normal measurement operation. Alternatively, the capacitance is discharged when no defect is present. If, due to, for example, the presence of a defect in the measuring- and operating electronics 1, it is not possible to eliminate this voltage difference on the input of the operational amplifier OP within a given time span, the voltage difference remains and the output signal $U_{OUT}$ of the operational amplifier OP leaves the provided working range and transfers at the point in time $t_1$ to the saturation voltage $U_{S1}$. The time span is determined by the capacitance C and the resistances $R_1$, $R_2$.

If the voltage difference between the inputs of the operational amplifier OP lies within the working range, the output voltage has, depending on size of the voltage difference, different slopes between $t_0$ and $t_1$. The output signal of the operational amplifier OP thus transfers to the saturation voltage $U_{S1}$, $U_{S2}$ with different speeds. If the voltage difference between the inputs of the operational amplifier OP lies outside the working range, the operational amplifier OP outputs as output voltage $U_{OUT}$ the saturation voltage $U_{S1}$, $U_{S2}$ (See FIG. 7).

If the output voltage $U_{OUT}$ lies outside the working range of the operational amplifier OP, this is an indicator for a defect being present and can be detected by means of the proposed evaluation unit.

LIST OF REFERENCE CHARACTERS

O operating means/driver
C1 connection on 2L current loop
C2 connection on 2L current loop
A/D analog-digital converter
CPU control unit
IC control unit
I1 electrical current corresponding to the primary feedback signal
I2 electrical current corresponding to the reference input
K1 comparator
K2 comparator
L load
M measuring resistor
PS voltage supply
OP operational amplifier
R1 resistor
R2 resistor
R3 resistor
S measuring transducer/sensor
ECC electrical current controller
S1 reference value
S2 reference value
$U_{S1}$ upper saturation voltage
$U_{S2}$ lower saturation voltage
$U_{DES}$ desired value
$U_{ACT}$ actual value
$U_{EE}$ upper operating voltage
$U_{CC}$ lower operating voltage
$U_1$ highest working range voltage
$U_2$ lowest working range voltage
$U_{IN}$ input voltage in the operational amplifier
$U_{OUT}$ output voltage of the operational amplifier
V comparator/summation point
$t_0$ start of rectangular pulse
$t_1$ reaching saturation voltage
1 measuring- and operating electronics
10 evaluation unit

The invention claimed is:

1. A measuring device with measuring- and operating electronics, said measuring- and operating electronics serve for determining and/or monitoring at least one measurement signal of a physical and/or chemical, measured variable of a measured substance, said measuring- and operating electronics has at least one control unit and an electrical current controller, and said measuring- and operating electronics is connected to a current loop, wherein a measurement signal current in the current loop represents a measured value of the measured variable, said control unit is connected with the electrical current controller and provides the electrical current controller with a reference input, said reference input corresponds to a desired value of the measurement signal current, said electrical current controller is fed a primary feedback signal, the primary feedback signal corresponds to an actual value of the measurement signal current set in the current loop, the primary feedback signal and the reference input are applied to an input of the electrical current controller, and said electrical current controller outputs a control signal formed from a control error signal between the primary feedback signal and the reference input, said measuring and operating electronics comprises:

at least one evaluation unit, said evaluation unit compares at least one value of the control signal output by said electrical current controller with at least one reference value, and the comparison indicates whether the value of the control signal exceeds or subceeds said reference value.

2. The measuring device as claimed in claim 1, wherein:
the measuring device has a control element, and said control element sets the measurement signal current in the current loop by means of the control signal output by said electrical current controller.

3. The measuring device as claimed in claim 1, wherein:
said electrical current controller has at least one comparator, wherein the comparator determines the control error signal.

4. The measuring device as claimed in claim 1, wherein:
said electrical current controller has at least one operational amplifier.

5. The measuring device as claimed in claim 4, wherein:
said comparator is electrically connected with an input of said operational amplifier; and
said operational amplifier produces and outputs the control signal based on the control error signal.

6. The measuring device as claimed in claim 4, wherein:
said operational amplifier is supplied with at least one operating voltage; and
said operational amplifier has a working range below the operating voltage.

7. The measuring device as claimed in claim 6, wherein:
the control signal leaves the working range of said operational amplifier, when the difference between the primary feedback signal and the reference input is not approximately zero after a predetermined time span.

8. The measuring device as claimed in claim 6, wherein:
in the case in which the control signal lies outside the working range of said operational amplifier, the control signal is approximately equal to the operating voltage of said operational amplifier.

9. The measuring device as claimed in claim 1, wherein:
the at least one reference value lies above, or below, the working range of said electrical current controller.

10. The measuring device as claimed in claim 1, wherein:
said evaluation unit is composed at least partially of a comparator circuit and/or an analog-digital converter.

11. The measuring device as claimed in claim 1, wherein:
said evaluation unit outputs at least one output signal.

12. The measuring device as claimed in claim 11, wherein:
the output signal is transmittable to said control unit.

13. The measuring device as claimed in claim 11, wherein:
said control unit outputs a signal corresponding to the output signal, especially an defect signal.

* * * * *